(12) United States Patent
Brix

(10) Patent No.: US 9,096,461 B2
(45) Date of Patent: *Aug. 4, 2015

(54) BORON-FREE UNIVERSAL GLASS

(71) Applicant: Schott AG, Mainz (DE)

(72) Inventor: Peter Brix, Mainz (DE)

(73) Assignee: SCHOTT AG, Mainz (DE)

( * ) Notice: Subject to any disclaimer, the term of this patent is extended or adjusted under 35 U.S.C. 154(b) by 24 days.

This patent is subject to a terminal disclaimer.

(21) Appl. No.: 13/914,117

(22) Filed: Jun. 10, 2013

(65) Prior Publication Data

US 2014/0005027 A1   Jan. 2, 2014

Related U.S. Application Data

(63) Continuation of application No. PCT/EP2011/070004, filed on Nov. 14, 2011.

(30) Foreign Application Priority Data

Dec. 8, 2010 (DE) .................. 10 2010 054 967

(51) Int. Cl.
  *C03C 3/087* (2006.01)
  *C03C 4/20* (2006.01)

(52) U.S. Cl.
  CPC .. *C03C 4/20* (2013.01); *C03C 3/087* (2013.01)

(58) Field of Classification Search
  CPC .................................................. C03C 3/087
  USPC .......................................................... 501/70
  See application file for complete search history.

(56) References Cited

U.S. PATENT DOCUMENTS

| 3,540,893 | A | * | 11/1970 | Petticrew | 501/2 |
| 3,819,387 | A | * | 6/1974 | Leger et al. | 501/4 |
| 5,508,237 | A |   | 4/1996 | Moffatt | |
| 8,629,072 | B2 | * | 1/2014 | Brix | 501/70 |
| 2002/0147102 | A1 | * | 10/2002 | Yamazaki et al. | 501/70 |
| 2009/0197088 | A1 | * | 8/2009 | Murata | 428/410 |
| 2009/0239102 | A1 |   | 9/2009 | Nagashima et al. | |
| 2011/0098172 | A1 | * | 4/2011 | Brix | 501/57 |
| 2013/0118575 | A1 | * | 5/2013 | Okato et al. | 136/256 |

FOREIGN PATENT DOCUMENTS

| DE | 69916683 | | 4/2005 |
| EP | 0672629 | | 9/1995 |
| EP | 1170264 | | 1/2002 |
| JP | 10-045422 | | 2/1998 |
| JP | 10045422 | A * | 2/1998 |
| WO | WO 2007080924 | A1 * | 7/2007 |
| WO | WO 2011158841 | A1 * | 12/2011 |

OTHER PUBLICATIONS

International Search Report dated Aug. 7, 2012 corresponding to International Patent Application No. PCT/EP2011/07004, 5 pages.
Written Opinion dated Aug. 7, 2012 corresponding to International Patent Application No. PCT/EP2011/07004, 7 pages.
Zdaniewski, W., "DTA and X-Ray Analysis Study of Nucleation and Crystallization of MgO-Al2O3-SiO2 Glasses Containing ZrO2, TiO2 and CeO2," Dept. of Organic Chemistry, Chalmers Univ. of Tech., Gothenburg, Sweeden, Journal of the American ceramic society, May-Jun. 1975, pp. 163-169.
English translation of the International Preliminary Report on Patentability dated Jun. 12, 2013 corresponding to International Patent Application No. PCT/EP2011/070004.

* cited by examiner

*Primary Examiner* — Anthony J Green
*Assistant Examiner* — Elizabeth A Bolden
(74) *Attorney, Agent, or Firm* — Ohlandt, Greeley, Ruggiero & Perle, LLP

(57) ABSTRACT

Universal glasses are provided which have the composition, in percent by weight on an oxide basis, 65-75 of $SiO_2$, 11-18 of $Al_2O_3$, 5-10 of MgO, 5-10 of CaO, which are free of $B_2O_3$, SrO, BaO, $CeO_2$ and PbO and have a hydrolytic resistance in the first class in accordance with DIN ISO 719, an acid resistance at least in the second class in accordance with DIN 12116 and an alkali resistance at least in the second class in accordance with DIN ISO 695.

19 Claims, No Drawings

BORON-FREE UNIVERSAL GLASS

CROSS REFERENCE TO RELATED APPLICATIONS

This application is a continuation of International Patent Application PCT/EP2011/070004, filed on Nov. 14, 2011, designating the U.S., which International Patent Application has been published in German language and claims priority from German Patent Application DE 10 2010 054 967.3, filed on Dec. 8, 2010. The entire contents of these priority applications are incorporated herein by reference.

BACKGROUND OF THE INVENTION

The invention relates to chemically stable universal glasses which can be melted without addition of boron-containing raw materials (boron-free universal glasses).

The term "universal glass" encompasses glasses which have very good chemical resistance and low thermal expansion and are suitable for wide industrial application and commercial use.

Known universal glasses include, inter alia, Duran® from Schott AG, Mainz, DE and Pyrex® from Corning Inc., USA. Borosilicate glasses having about 13% by weight of $B_2O_3$ in the synthesis have been known for a long time. Owing to the low thermal expansion, they have a high temperature change resistance (TCR) and are therefore stable to changes in temperature during use of the glasses.

Furthermore, these glasses are "neutral" in that they do not release any significant amounts of glass constituents into solutions present therein. They therefore also belong to the group of "neutral glasses" and can be used as primary packaging materials in the pharmaceuticals industry, in particular for injection solutions.

The measurements and classifications of the chemical constituents of industrial glasses are carried out according to standardized measurement methods as per table 1:

TABLE 1

Classes of chemical resistance for industrial glasses

| | Resistance to . . . | | |
|---|---|---|---|
| | Water (H) | Acid (Ac) | Alkali (Alk) |
| Standard | DIN ISO 719 | DIN 12116 | DIN ISO 695 |
| Solution | Dist. $H_2O$ | 6N HCl (half-conc.) | 0.5M $Na_2CO_3$ + 0.5M NaOH |
| Temperature | 98° C. | 108° C. | 102° C. |
| Time | 1 hour | 6 hours | 3 hours |
| Unit | μg of $Na_2O$/g of glass | mg/dm² | mg/dm² |
| Class 1 | up to 31 | up to 0.7 | up to 75 |
| Class 2 | up to 62 | up to 1.5 | up to 175 |
| Class 3 | up to 264 | up to 15 | above 175 |
| Class 4 | up to 620 | above 15 | |
| Class 5 | above 620 | | |

Neutral glasses are within the first hydrolytic class and first acid class and at least in the second alkali class; they are therefore referred to here as "1-1-2 glasses".

Boron-free glasses naturally cannot meet the requirements of the standard DIN ISO 3585 ("Borosilicate glass 3.3—Properties") which have to be met by a laboratory glass, i.e. chemically and thermally stable glasses for apparatus construction, since the glasses in question here are explicitly borosilicate glasses and the property values in their totality set down in the standard can also only be met by borosilicate glasses. However, boron-free glasses are in principle also suitable for use as laboratory glass since they can have not only the very good chemical resistances (1-1-2 glass) but also a very low thermal expansion.

Although boron oxide is present in SCHOTT Duran® 8412 in an amount of only about 13%, the boron raw materials incur the predominant part of the total raw materials costs. The raw materials situation for borosilicate glasses without sodium oxide, e.g. alkali metal-free glasses for LCD display screens, is even more unfavorable because in this case the much more expensive raw material boric acid, which firstly has to be obtained industrially from borax, has to be used. The costs for the glass component $B_2O_3$ from the raw material boron oxide are about seven times as high as the costs for $B_2O_3$ from the raw material disodium tetraborate pentahydrate.

The EU (European Union) has recently classified boric acid, diboron trioxide, anhydrous disodium tetraborate, disodium tetraborate decahydrate and disodium tetraborate pentahydrate as having reproductive toxicity. As a consequence, particular boundary conditions have to be adhered to and particular precautionary measures have to be taken during production using such raw materials.

Owing to the relatively high costs of boron-containing raw materials, the foreseeable shortage of suitable qualities and the current discussion on new toxicity classifications for boron compounds, boron-free glasses are of interest as alternatives to borosilicate glasses.

For use as substrate glass, e.g. as solar glass, touch panel glass, the good chemical resistance of boron-free glasses is advantageous since these substrate glasses are subjected in most production processes to cleaning using aqueous solutions and acids, after which the glass surface must not display any changes. Good chemical resistance is likewise advantageous for good weathering resistance.

Apart from very good chemical resistance, further requirements have to be met by universal glasses or neutral glasses.

Thus, the glass has to be able to be produced in conventional melting apparatuses, i.e. the viscosity of the melt must not be too high—the processing temperature (temperature at which the viscosity is $10^4$ dPas, also referred to as VA or T4) should in no event exceed a maximum value of 1320° C. T4 should be as low as possible in the interests of energy-saving production.

A further parameter for producibility is sufficient devitrification stability, i.e. the tendency to form crystals from the melt during production should be very low.

Many boron oxide-free glasses are described as "chemically stable" in the literature without information being given on material removal values or the like, or the information on chemical stability cannot simply be carried over to the standards in table 1.

Although a series of boron-free glasses are known from the prior art, these are essentially unsuitable as universal glasses according to the present definition.

The document JP 10-045422 discloses a glass having the composition 66-72 mol % of $SiO_2$, from 10 to 14 mol % of $Al_2O_3$, from 0 to 1.5 mol % of $B_2O_3$, from 0 to 10 mol % of MgO, from 0 to 10 mol % of CaO, from 0 to 10 mol % of SrO and from 0 to <1 mol % of BaO, which has a thermal expansion a in the range from 20° C. to 300° C. of ≤4 ppm/K and a processing temperature T4 above 1300° C. The processing temperature T4 is too high for economical production. The acid resistance is also poor.

SUMMARY OF THE INVENTION

It is a first object of the invention to disclose a boron oxide-free neutral glass.

It is a second object of the invention to disclose a boron oxide-free neutral glass having a low thermal expansion, preferably $\alpha_{20/300} \leq 4 \cdot 10^{-6}/K$.

It is a third object of the invention to disclose a boron oxide-free neutral glass that can be produced in conventional melting plants.

It is a forth object of the invention to disclose a boron oxide-free glass having a hydrolytic resistance in accordance with DIN ISO 719 being in the 1st hydrolytic class.

It is a fifth object of the invention to disclose a boron oxide-free glass having a hydrolytic resistance in accordance with the acid resistance in accordance with DIN 12116 being at least in the 2nd acid class.

It is a sixth object of the invention to disclose a boron oxide-free glass having a hydrolytic resistance in accordance with the alkali resistance in accordance with DIN ISO 695 being in at least the 2nd alkali class.

According to one aspect these and other objects are achieved by a universal glass which contains at least the following constituents (in % by weight on an oxide basis):

| | |
|---|---|
| $SiO_2$ | 65-75, |
| $Al_2O_3$ | 11-18, |
| MgO | 5-10, |
| CaO | 5-10, | where, except for unavoidable impurities, no $B_2O_3$, SrO, BaO, $CeO_2$ and PbO are present and the hydrolytic resistance in accordance with DIN ISO 719 is in the 1st hydrolytic class, the acid resistance in accordance with DIN 12116 is at least in the 2nd acid class and the alkali resistance in accordance with DIN ISO 695 is in at least the 2nd alkali class.

When for the purposes of the present patent application, reference is made to "unavoidable impurities", this means essentially that the purity of the raw materials used is such that the content of the respective impurity is not more than 1% by weight, in particular not more than 0.5% by weight or even not more than 0.1% by weight, unless a particular value is indicated in the individual case.

In the case of cerium oxide, a deliberate addition of cerium oxide is not carried out. Consequently, cerium oxide is present in an amount of not more than 0.1% by weight, preferably not more than 0.01% by weight. Owing to its fluorescent properties, cerium oxide is disadvantageous when using the glass as universal glass. In addition, it is a very expensive raw material.

A minimum content of 65% by weight of $SiO_2$ is in the case of these boron-free glasses the basic prerequisite for acid resistance in the first class. If the maximum content of 75% is exceeded, the processing temperature increases to values above 1320° C. and the melt is thus much too viscous to be produced economically in conventional melting apparatuses.

The $SiO_2$ content is preferably at least 68% by weight, more preferably not more than 71% by weight.

$Al_2O_3$ effects stabilization against devitrification and increases the chemical resistance as a result of alkali metal and alkaline earth metal ions being bound more strongly into the glass structure. It is present in the glass in amounts of at least 11% by weight. The $Al_2O_3$ content is preferably more than 12% by weight, more preferably at least 12.5% by weight.

The maximum content of $Al_2O_3$ is 18% by weight, preferably 17% by weight, in particular 14% by weight.

At lower contents, the crystallization tendency would increase correspondingly; excessively high contents would impair the acid resistance of the glasses.

The addition of alkali metal oxides leads to higher coefficients of thermal expansion, and only relatively small amounts, namely less than 5% of $Na_2O$, are therefore used. It is in principle also possible to use the two other alkali metal oxides $Li_2O$ and $K_2O$ instead of $Na_2O$, but $Na_2O$ is preferred for costs reasons. $K_2O$-containing melts also often lead to increased tank brick corrosion. In addition, all naturally occurring potassium-containing raw materials contain the radioactive isotope $^{40}K$, which is undesirable for some electrical applications.

In the case of low-expansion glasses, preference is given to omitting addition of alkali metal oxides entirely. For the purposes of the present invention, alkali metal-free means that the glasses contain alkali metal oxides in only unavoidable traces which are introduced via raw materials or crucible materials. The content of these unavoidable impurities is generally below 1% by weight, preferably not more than 0.1% by weight, more preferably not more than 0.05% by weight or not more than 0.01% by weight, in the finished glass.

To lower the viscosity of the melt, the glasses contain the two alkaline earth metal oxides MgO and CaO as fluxes. MgO is significantly more effective in lowering T4 than CaO. It would actually be advantageous for the ratio of CaO to MgO on a weight basis to be in the range from 1.4 to 1.8 (or, when the concentrations are expressed in mol %, in the range from 1.0 to 1.6). At this ratio, it is possible to use the inexpensive raw materials dolomite and lime without the expensive raw material $MgCO_3$ or even more expensive Mg raw materials additionally having to be used. Unfortunately, low-expansion glasses whose T4 value is below 1320° C. would no longer be possible at the ratio mentioned.

The total content of MgO and CaO is preferably at least 14% by weight, more preferably not more than 18% by weight.

Furthermore, the content of MgO and of CaO is preferably in each case 7-10% by weight, more preferably 7-9% by weight.

Addition of the alkaline earth metal oxides SrO and BaO is not carried out since these components are not quite unproblematical in terms of toxicity and, particularly in the application as primary pharmaceutical packaging, clouding precipitates can occur on contact with solutions of some specific, usually sulfur-containing active compounds. The density of the glasses would also be increased by use of the heavy alkaline earth metal oxides, but a low glass density leading to a reduction in the weight of the components is in the interest of the user. The use of lead oxide PbO is to be avoided for toxicological reasons.

Zinc oxide ZnO acts here as flux, similarly to the alkaline earth metal oxides, and can be present in the glass in an amount of up to 10% by weight. A disadvantage of the use of this component is the tendency to vaporize with subsequent condensation of the vaporization products, which, particularly in the case of the float glass process, can lead to undesirable defects on the surface of the glass articles. For this reason, zinc oxide is preferably not present in the glass, except for unavoidable impurities.

Titanium oxide $TiO_2$ can improve the hydrolytic resistance of the glasses and always brings about increased absorption of UV radiation. However, it also leads to increased mix prices and, is undesirable as glass component in some applications. In addition, the occurrence of a brown color is often observed, and interferes for some applications. This coloration is all the more pronounced the more iron oxide is introduced into the glass by the raw materials or the reuse of broken glass.

The glass is therefore, except for unavoidable impurities, free of titanium oxide and also free of iron oxide.

Zirconium oxide greatly increases the alkali resistance of the glasses, but this is not of particularly great relevance for most applications. It can be present in an amount of up to 10% by weight.

However, zirconium oxide is preferably not used since its use would result in the mix costs increasing, the melting behavior of the mix deteriorating, particularly in the case of low-alkali metal compositions, and the viscosity of the melt increasing and, as heavy metal, it is undesirable in some applications. The glass therefore preferably does not contain any zirconium oxide, except for unavoidable impurities.

The glass can contain conventional refining agents in customary amounts of up to 2% by weight, preferably up to 1.5% by weight, more preferably up to 1 or even at most up to 0.5% by weight.

Thus, a total of up to 1.5% by weight of $As_2O_3$, $Sb_2O_3$, $SnO_2$, $MnO_2$, $Fe_2O_3$, $Cl^-$ (e.g. as NaCl or $ZnCl_2$), $F^-$ (e.g. as $CaF_2$ or $MgF_2$) and/or sulfate (e.g. as $Na_2SO_4$ or $ZnSO_4$) may be present, with $CeO_2$ being present in an amount of at most up to the maximum limit of 0.1% by weight. The addition of fluoride reduces the viscosity of the melt, which accelerates refining. For reasons of environmental protection, the addition of $As_2O_3$ or $Sb_2O_3$ should be dispensed with where possible.

Although a good glass quality can be obtained even without the addition of a refining agent on a laboratory scale, the addition of a refining agent could prove to be necessary for improving the bubble quality in industrial production. In the case of variants containing sodium oxide, part of the $Na_2O$ can be introduced via the refining agent sodium chloride (NaCl). However, the acid resistance could be impaired by the addition of chloride. The use of chlorides in the neutral glass could be problematical for the following reason: on reheating, vaporization of chlorides and subsequent condensation on the glass articles can occur. This phenomenon is known by the term "lamp rings", e.g. in the cutting to length of tubes before the lamp. The addition of chlorides should be kept as small as possible. It is also possible to use known alternative refining methods, e.g. sulfate refining or high-temperature boosting.

Volatile fluorides can, in a manner analogous to chlorides, display vaporization and condensation phenomena during melting and in hot processing. This can lead, under some circumstances, to a shorter life of the shaping materials used. When aqueous or other solutions act on the glass, fluorides can also go from the glass into the liquid and cause undesirable reactions with the constituents there. The proportion of fluoride should therefore be kept as small as possible and not exceed the upper limit of 1.5%.

DETAILED DESCRIPTION

EXAMPLES AND COMPARATIVE EXAMPLES

A number of examples from the family LAS glass-ceramics were tested in respect of their acid resistance in accordance with DIN 12116 both before and after ceramization, but in no case achieved the acid class 1.

Furthermore, numerous aluminosilicate glasses were melted and their properties were measured.

Boron oxide-free aluminosilicate glasses used as starting glass ("green glass") for glass-ceramics generally have good hydrolytic resistances but the acid resistance is unsatisfactory, see, for example, compositions C1 (Salama S. N., Salman S. M. and Gharib S., J. Non-Cryst. Solids, 1987, vol. 93, No. 1, p. 203) and C2 (Zdaniewski W., J. Am. Ceram. Soc., 1975, vol. 58, No. 5-6, p. 163). C3 and C4 (examples from U.S. Pat. No. 5,508,237) are boron-free substrate glasses for flat screens, see

TABLE 2

Table 2: Comparative examples from the prior art (concentrations indicated in % by weight on an oxide basis).

|  | C1 | C2 | C3 | C4 |
|---|---|---|---|---|
| $SiO_2$ | 60.68 | 59.83 | 65.90 | 65.70 |
| $Al_2O_3$ | 28.08 | 17.09 | 13.00 | 8.00 |
| $Li_2O$ | 2.74 | | | |
| MgO | 8.50 | 8.55 | | |
| CaO | | | | 5.70 |
| SrO | | | 0.40 | 12.90 |
| BaO | | | 20.70 | 7.70 |
| $TiO_2$ | | 5.98 | | |
| $CeO_2$ | | 8.55 | | |
| $\alpha_{20/300}$ ($10^{-6}$/K) | 3.92 | 3.33 | | 5.00 |
| Density (g/cm$^3$) | 2.4934 | 2.6557 | | 2.7337 |
| Tg (° C.) | 721 | 762 | | 757 |
| T7.6 (° C.) | devitrifies | devitrifies | | 989 |
| T4 (° C.) | 1228 | 1259 | | 1323 |
| H (μg/g) | 14 | 12 | | 13 |
| Ac (mg/dm$^2$) | 31 | 116 | | 0.6 |
| Al (mg/dm$^2$) | 115 | 142 | | 91 |

Glasses having the indicated composition (in % by weight) were produced by melting conventional raw materials in an inductively heated Pt/Rh crucible (Pt20Rh) at 1650° C. The glasses can have a reddish brown color due to a small content of these noble metals, which normally does not have any influence on the properties measured here. To avoid the coloration caused by noble metals, it is possible to use a lining crucible made of fused silica. The melting time was from three to four hours. The melt was subsequently homogenized by stirring at 1600° C. for one hour and then allowed to stand at this temperature without stirring for two hours in order to allow any bubbles present to rise to the surface. The melt was cooled at a defined cooling rate of 30 K/h.

C1 and C2 are very stable to attack by water, but far removed from the objective of the first acid class (weight loss to 0.7 mg/dm$^2$). The melt of C3 was very viscous, and it was therefore not possible to cast a suitable glass block. C4 is actually a boron oxide-free 1-1-2 glass, but the processing temperature T4 is above 1320° C. and therefore too high for economical production in commercial melting apparatuses. In addition, high contents of SrO and BaO are generally undesirable since there is a risk of precipitates on contact with sulfur-containing medicaments (sulfones, sulfates and the like). The components SrO and BaO should preferably not be present at all because of such concerns.

A series of comparative examples (C5 to C10) was melted in the above-described way. The respective compositions in percent by weight on an oxide basis, the coefficients of thermal expansion in the range from 20° C. to 300° C. $\alpha_{20/300}$ [$10^{-6}K^{-1}$], the glass transition temperature Tg [° C], the upper cooling temperature T13 [° C], the softening temperature T7.6 [° C], the processing temperature T4 [° C.] in accordance with DIN 52312, the hydrolytic resistance H (base equivalent of the acid consumption as μg of $Na_2O$/g of powdered glass), the removal of material values Ac after acid attack [mg/dm$^2$] and Al after alkali attack [mg/dm$^2$] and also the modulus of elasticity E modulus [GPa] are listed in table 3 below.

It can be seen that hydrolytically stable glasses can be produced by use of relatively large proportions of the components $TiO_2$ and $ZrO_2$, particularly when the component $TiO_2$ is present in relatively large proportions. Glasses which are in the first class of alkali resistance can also be obtained, particularly when the component $ZrO_2$ is present in relatively large proportions. However, the glasses containing these components, regardless of whether they are present individually or together, do not achieve the preferred first acid class.

TABLE 3

Boron-free aluminosilicate glasses (comparative examples), concentrations indicated in % by weight on an oxide basis

|  | C5 | C6 | C7 | C8 | C9 | C10 |
|---|---|---|---|---|---|---|
| $SiO_2$ | 63.2 | 65.0 | 64.0 | 65.0 | 64.0 | 64.0 |
| $Al_2O_3$ | 20.0 | 17.5 | 17.5 | 17.5 | 17.5 | 17.5 |
| $Na_2O$ |  |  | 3.0 |  | 3.0 | 3.0 |
| MgO | 6.0 | 8.3 | 6.3 | 8.3 | 6.3 | 4.9 |
| CaO | 6.8 | 5.4 | 5.4 | 5.4 | 5.4 | 6.8 |
| $TiO_2$ | 4.0 | 3.8 | 1.9 |  |  | 1.9 |
| $ZrO_2$ |  |  | 1.9 | 3.8 | 3.8 | 1.9 |
| $\alpha_{20/300}$ ($10^{-6}$/K) | 3.56 | 3.62 | 4.28 | 3.48 | 4.25 | 4.4 |
| Density (g/cm$^3$) | 2.542 | 2.5346 | 2.5295 | 2.5593 | 2.5436 | 2.5328 |
| Tg (° C.) | 761 | 756 | 735 | 791 | 751 | 731 |
| T7.6 (° C.) | 979 | 973 | 954 | 1003 | 973 | 958 |
| T4 (° C.) | 1274 | 1269 | 1280 | 1298 | 1296 | 1284 |
| H (μg/g) | 11 | 11 | 8 | 7 | 12 | 13 |
| Ac (mg/dm$^2$) | 3.7 | 2.3 | 1.9 | 1.4 | 1.3 | 2 |
| Al (mg/dm$^2$) | 97 | 88 | 59 | 51 | 47 | 52 |

TABLE 4

Boron-free aluminosilicate gasses (comparative examples and glasses according to the invention), concentrations indicated in % by weight on an oxide basis

|  | C11 | C12 | E1 | E2 | E3 | C13 |
|---|---|---|---|---|---|---|
| $SiO_2$ | 63.0 | 62.0 | 69.0 | 69.0 | 71.0 | 66.2 |
| $Al_2O_3$ | 17.2 | 16.2 | 17.0 | 17.0 | 17.0 | 20.8 |
| $Na_2O$ |  |  | 0 |  | 2.0 |  |
| MgO | 9.0 | 9.0 | 8.0 | 8.0 | 5.0 | 5.0 |
| CaO | 4.0 | 4.0 | 6.0 | 6.0 | 5.0 | 8.0 |
| $ZrO_2$ | 6.8 | 8.8 |  |  |  |  |
| $SnO_2$ |  |  |  |  |  | 0.2 |
| $\alpha_{20/300}$ ($10^{-6}$/K) | 3.45 | 3.52 | 3.4 | 3.44 | 3.56 | 3.55 |
| Density | 2.6073 | 2.6408 | 2.4801 | 2.4766 | 2.4275 | 2.5066 |
| Tg (° C.) | 796 | 793 | 787 | 781 | 767 | 803 |
| T13 (° C.) |  |  | 797 | 796 | 781 | 814 |
| T7.6 (° C.) | 1003 | 1021 | 1014 | 1012 | 1024 | 1023 |
| T4 (° C.) | 1316 | 1331 | 1337 | 1335 | 1399 | 1337 |
| H (μg/g) | 13 | 12 | 11 | 10 | 9 | 13 |
| Ac (mg/dm$^2$) | 4.1 | 15.6 | 0.9 | 0.8 | 1.1 | 1.4 |
| Al (mg/dm$^2$) | 42 | 36 | 83 | 81 | 74 | 87 |

Further glasses having sometimes higher contents of $SiO_2$, without addition of $TiO_2$ and sometimes without $ZrO_2$, are summarized in table 4. The table contains glasses according to the invention E1 to E3 and comparative examples C11 to C13. The glasses according to the invention are free of zirconium oxide and titanium oxide, and apart from E3 also free of alkali metal oxides. They have a hydrolytic resistance in class 1, an acid resistance in class 2 and an alkali resistance in class 2 (E3 in class 1). However, the processing temperature is sometimes still very high.

TABLE 5

Boron-free aluminosilicate glasses (comparative examples and glasses according to the invention), concentrations indicated in % by weight on an oxide basis

|  | C14 | C15 | E4 | E5 | C16 | C17 |
|---|---|---|---|---|---|---|
| $SiO_2$ | 70.0 | 72.0 | 69.8 | 69.8 | 69.8 | 69.8 |
| $Al_2O_3$ | 13.0 | 11.0 | 12.6 | 12.8 | 12.8 | 12.8 |
| $Na_2O$ |  |  |  |  |  |  |
| MgO | 12.0 | 12.0 | 9.0 | 9.0 | 6.0 | 8.0 |
| CaO | 4.0 | 4.0 | 6.5 | 8.2 | 5.2 | 8.2 |
| $TiO_2$ | 0.8 | 0.8 | 1.9 |  |  |  |
| ZnO |  |  |  |  | 6.0 | 4.0 |
| $SnO_2$ | 0.2 | 0.2 | 0.2 | 0.2 | 0.2 | 0.2 |
| $\alpha_{20/300}$ ($10^{-6}$/K) |  |  | 3.65 | 3.82 | 3.24 | 3.41 |
| Density (g/cm$^3$) |  |  | 2.4987 | 2.5003 | 2.5388 | 2.5299 |
| Tg (° C.) |  |  | 768 | 755 | 752 | 753 |
| T7.6 (° C.) |  |  | 977 | 977 | 990 | 982 |
| T4 (° C.) |  |  | 1298 | 1289 | 1332 | 1312 |
| H (μg/g) |  |  | 14 | 17 | 9 | 11 |
| Ac (mg/dm$^2$) |  |  | 1.4 | 0.5 | 1.9 | 2.0 |
| Al (mg/dm$^2$) |  |  | 74 | 82 | 93 | 96 |
| E modulus (GPa) |  |  | 88 | 88 | 87 | 88 |

Finally, further glasses with comparative examples C14 to C17 and glasses according to the invention E4 and E5 are present in table 5. In the cases of the glasses according to the invention, the processing temperature T4 is below 1300° C.

While the glass E4 is still in the acid class 2, the glass E5 is a particularly preferred glass which has excellent chemical resistance in the class 1-1-1. It is also alkali metal-free. Likewise, the thermal expansion is $3.82 \cdot 10^{-6}$/K and therefore below $4 \cdot 10^{-6}$/K. Furthermore, no titanium oxide, zirconium oxide or zinc oxide is present. Finally, no expensive or environmentally damaging raw materials are used.

Glass E5 meets all the above mentioned requirements for a low-expansion universal glass. The streaking and bubble quality was very good.

The glasses C14 and C15 displayed high clouding after casting, and no further measurements on these were therefore carried out. The cause of the clouding is phase separation on cooling of the melt due to an excessively high MgO content of 12%.

To assess the devitrification stability, glass samples of 15 were melted at 1500° C. for 30 minutes and heat treated for five hours in a gradient furnace. No defined devitrification could be observed in the temperature range from 1150 to 1423° C. The devitrification stability of this boron-free universal glass, which also meets the properties of a neutral glass, can therefore be classed as very good.

As a result of the omission of the expensive raw materials borax, boric acid and magnesium carbonate, the mix costs of the preferred glass 15 are significantly below the mix costs for known universal glasses.

What is claimed is:

1. A universal glass comprising, in percent by weight on an oxide basis:

| | |
|---|---|
| $SiO_2$ | 68-71 |
| $Al_2O_3$ | 12.5-14 |
| MgO | 5-10 |
| CaO | 5-10; and | wherein the total content of MgO and CaO is 14-18% by weight;

wherein, except for unavoidable impurities, no $B_2O_3$, SrO, BaO, $CeO_2$, ZnO, $TiO_2$, $Fe_2O_3$, $ZrO_2$, alkali metal oxides and PbO are present; and wherein the hydrolytic resistance in accordance with DIN ISO 719 is in the 1st hydrolytic class, the acid resistance in accordance with DIN 12116 is at least in the 2nd acid class and the alkali resistance in accordance with DIN ISO 695 is in at least the 2nd alkali class.

2. The universal glass of claim 1, further comprising at least one refining agent selected from the group consisting of $As_2O_3$, $Sb_2O_3$, $SnO_2$, $Cl^-$, $F^-$, and $SO_4^{2-}$, up to a total content of 2% by weight.

3. A universal glass comprising, in percent by weight on an oxide basis:

| | |
|---|---|
| $SiO_2$ | 65-75, |
| $Al_2O_3$ | 11-18, |
| MgO | 5-10, |
| CaO | 5-10, | less than 1% by weight of alkali metal oxides, wherein, except for unavoidable impurities, no $B_2O_3$, SrO, BaO, $CeO_2$ and PbO are present and the hydrolytic resistance in accordance with DIN ISO 719 is in the 1st hydrolytic class, the acid resistance in accordance with DIN 12116 is at least in the 2nd acid class and the alkali resistance in accordance with DIN ISO 695 is in at least the 2nd alkali class.

4. The universal glass of claim 3, wherein, except for unavoidable impurities, no ZnO is present.

5. The universal glass of claim 3, wherein, except for unavoidable impurities, no $TiO_2$ is present.

6. The universal glass of claim 3, wherein, except for unavoidable impurities, no $Fe_2O_3$ is present.

7. The universal glass of claim 3, wherein, except for unavoidable impurities, no alkali metal oxides are present.

8. The universal glass of claim 3, wherein the content of $SiO_2$ is at least 68% by weight.

9. The universal glass of claim 3, wherein the content of $Al_2O_3$ is at least 12.5% by weight.

10. The universal glass of claim 3, wherein the content of $Al_2O_3$ is not more than 14% by weight.

11. The universal glass of claim 3, wherein the total content of MgO and CaO is at least 14% by weight.

12. The universal glass of claim 3, wherein the total content of MgO and CaO is not more than 18% by weight.

13. The universal glass of claim 3, wherein the content of MgO is 7-10% by weight.

14. The universal glass of claim 3, wherein the content of MgO is 7-9% by weight.

15. The universal glass of claim 3, wherein the content of CaO is 7-10% by weight.

16. The universal glass of claim 3, further comprising refining agents in customary amounts of up to 2% by weight.

17. The universal glass of claim 3, further comprising a processing temperature, at a viscosity of the glass melt of $10^4$ dPas, of not more than 1350° C.

18. The universal glass of claim 3, further comprising a thermal expansion of not more than $4 \cdot 10^{-6}$ $K^{-1}$.

19. A universal glass comprising the following constituents, in percent by weight on an oxide basis:

| | |
|---|---|
| $SiO_2$ | 68-71, |
| $Al_2O_3$ | 12.5-14, |
| MgO | 5-10, |
| CaO | 5-10, | wherein, except for unavoidable impurities, no $B_2O_3$, SrO, BaO, $CeO_2$, ZnO, $TiO_2$, $Fe_2O_3$, alkali metal oxides and PbO are present and the hydrolytic resistance in accordance with DIN ISO 719 is in the 1st hydrolytic class, the acid resistance in accordance with DIN 12116 is at least in the 2nd acid class and the alkali resistance in accordance with DIN ISO 695 is in at least the 2nd alkali class.

* * * * *